United States Patent [19]
Wong et al.

[11] Patent Number: 6,034,699
[45] Date of Patent: Mar. 7, 2000

[54] RENDERING POLYGONS

[75] Inventors: Daniel Wai-him Wong, Toronto; Milivoje M. Aleksic, Ontario, both of Canada

[73] Assignee: ATI Technologies, Inc., Thornhill, Canada

[21] Appl. No.: 08/850,120

[22] Filed: May 1, 1997

[51] Int. Cl.[7] .................................................. G06T 11/00
[52] U.S. Cl. ............................................................ 345/441
[58] Field of Search .................................. 345/426, 427, 345/431, 432, 433, 434, 441

[56] References Cited

U.S. PATENT DOCUMENTS 5,446,836   8/1995   Lentz et al. .............................. 345/441

OTHER PUBLICATIONS

Computer Graphics Principles and Practice, Second Edition, "Basic Raster Graphics Algorithms for Drawing 2D Primitives," by James D. Foley, Addison–Wesley Pub. Co., pp. 92–99 and 866–875.

Microprocessor Report, "PC Graphics Reach New Level: 3D," vol. 10, No. 1, Jan. 22, 1996, by Yong Yao, ©1966 MicroDesign Resources, pp. 1–6.

Computer Graphics, vol. 25, No. 4, Jul. 1991, "A New Simple and Efficient Antialiasing with Subpixel Masks", Andreas Schilling et al., pp. 133–141.

Talisman: Commodity Realtime 3D Graphics for the PC, Jay Torsborg et al., Microsoft Corporation.

*Primary Examiner*—Almis R. Jankus
*Attorney, Agent, or Firm*—Markison & Reckamp

[57] ABSTRACT

A method and apparatus is used in a graphics system to scan a polygon that minimizes the number of pixels scanned outside of the polygon. A direction (e.g., the direction of the major scan axis) is chosen so that once inside the polygon, advancements along the direction do not take the scanning outside of the polygon until substantially all of the interior pixels of the polygon have been scanned. The direction is selected based on the angular orientations of the edges of the polygon. During the scanning, advancements along the direction result in starting points from which lines are pixels are scanned (e.g., lines following a minor scan axis). Each line of pixels ends at one of the edges of the polygon.

21 Claims, 14 Drawing Sheets

| group number | group [0:3] | possible orientation | initial scan [3:0] | possible orientation |
|---|---|---|---|---|
| 0 | 0000 | 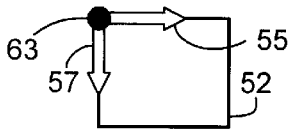 | 00 | |
| 1 | 0001 | 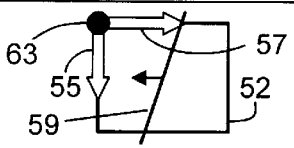 | 00 | 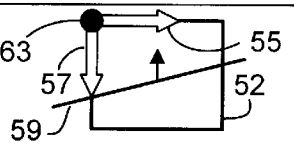 |
| 2 | 0010 | 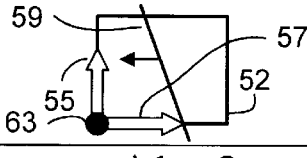 | 00 | 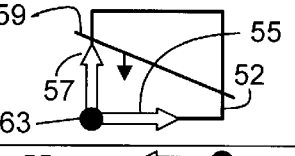 |
| 3 | 0100 | 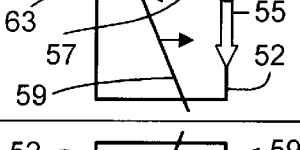 | 00 | 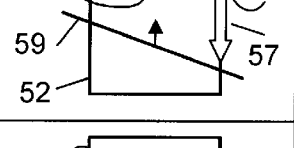 |
| 4 | 1000 | 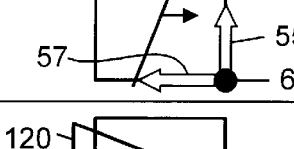 | 00 | 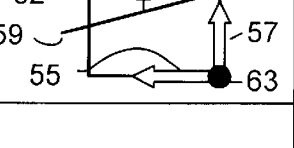 |
| 5 | 0011 | 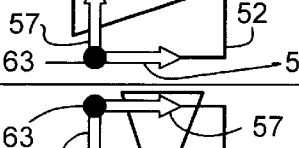 | 10 | |
| 6 | 0101 | 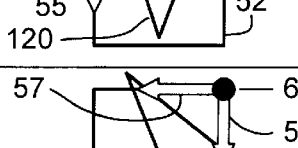 | 10 | |
| 7 | 0110 | 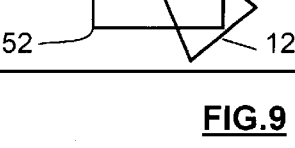 | 01 | 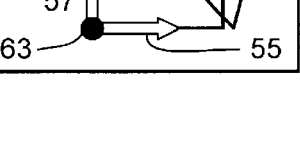 |
FIG.9

| group number | group [0:3] | possible orientation | initial scan [3:0] | possible orientation |
|---|---|---|---|---|
| 8 | 1001 | | 01 | |
| 9 | 1010 | | 10 | |
| 10 | 1100 | | 10 | |
| 11 | 0111 | | 01 | |
| 12 | 1011 | | 01 | |
| 13 | 1101 | | 01 | |
| 14 | 1110 | | 01 | |

FIG.10

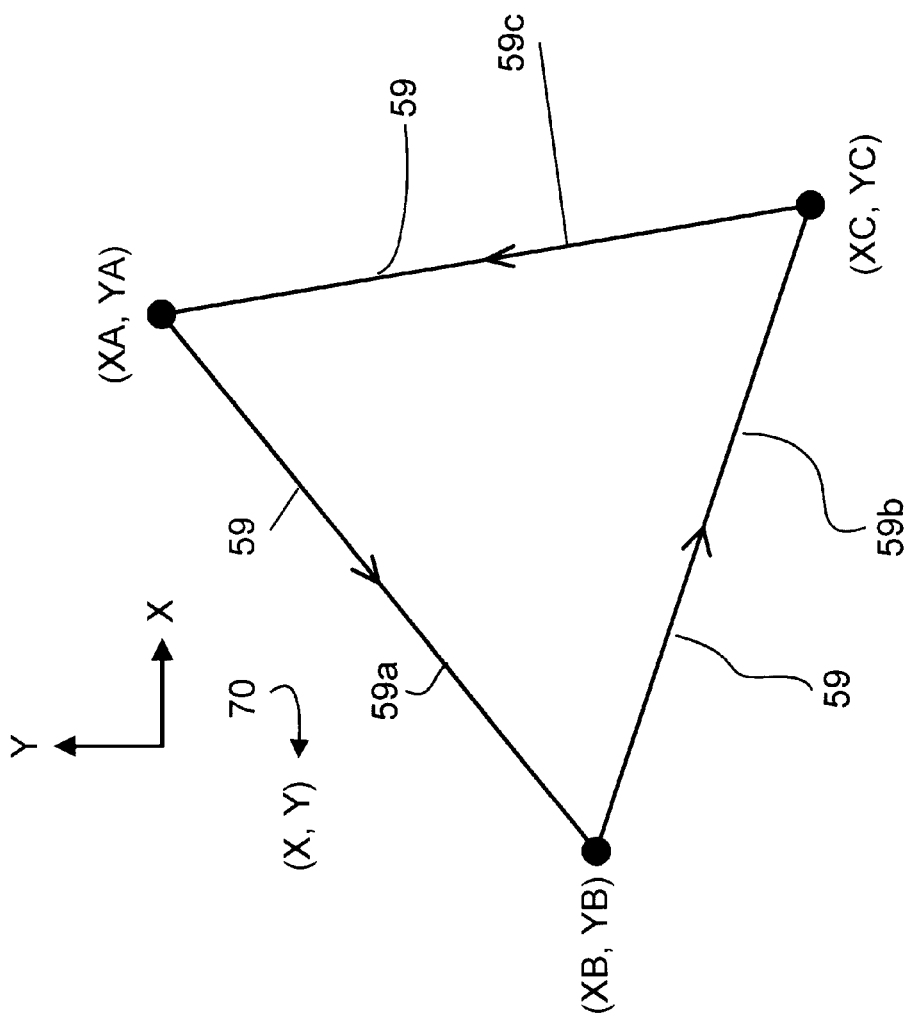

RENDERING POLYGONS

BACKGROUND OF THE INVENTION

The invention relates to rendering polygons in three-dimensional graphics systems.

As shown in FIGS. 1 and 2, for purposes of displaying a three-dimensional (3-D) image 6 on a two-dimensional (2-D) display 21, a typical graphics system 17 forms an image representative of the projection of the 3-D image 6 onto a planar viewing window 11. Thus, 3-D objects 8 of the image 6 are transformed into planar, 2-D objects 9 for viewing on the display 21.

The physical properties (e.g., size and appearance) of each object 9 are typically defined by a data structure 12 stored in a memory 15 of the graphics system 17. A graphics engine 14 of the system 17 typically renders the objects 9 by performing affine transformations (e.g., rotation and translation) of the objects 9 and forming image data which is stored in a buffer 18. A video output circuit 22 uses the image data stored in the buffer 18 to form horizontal scan lines (and thus, the objects 9) on the display 21.

Referring to FIG. 3, the graphics engine 14 uses the buffer 18 to build each frame 22 (i.e., one screen of the image) of the image by subdividing the frame 22 into horizontal bands 24. As shown in FIG. 4, to facilitate processing of the objects 9 by the graphics engine 14, the 2-D objects 9 (e.g., the object 9b) are typically represented by an arrangement of polygons (e.g., triangles 30) with the vertexes of the polygons stored in the data structures 12. The triangle 30 may represent a planar surface, or facet, of the object 9, and each triangle 30 has a set of characteristics (e.g., a lighting, a base color, and a texture) which determine a color fill pattern for the triangle. Facets (e.g., the front facet of the object 9b) of the object 9 may be defined by more than one triangle 30. To form the image data, the graphics engine 14 typically builds each triangle 30, one at a time, inside the buffer 18. The shape of the triangles 30 may be altered by objects 9 that penetrate or partially hide the triangle 30.

Referring to FIG. 5, the triangles 30 frequently do not fit entirely within the boundaries of the horizontal bands 24. As a result, portions of the triangle 30 may be clipped by the horizontal band 24. For example, one horizontal band 24a may have polygons 36 formed from portions of three triangles 30. Each polygon 36 is not only defined by edges 31 of the original triangle 30 but also by edges 34 of the horizontal band 24a.

The edges of the polygon 36 only define the boundaries of the polygon 36. To fill in, or paint, the interior of the polygon 36, the graphics engine 14 subdivides the horizontal band 24 into rectangular scan windows, or tiles 39 (for clarity, only one tile is shown in FIG. 5). The polygon 36 may span across more than one tile 39.

The graphics engine 14 typically fills in the interior of the polygons 36, one at a time, with the color pattern associated with the triangle 30 (associated with the polygon 36). Thus, for each pixel inside the polygon 36, the graphics engine 14 transfers an associated color value (e.g., a sixteen bit value that represents the color of the pixel) to the buffer 18.

Because the graphics engine 14 cannot see the edges of the polygon 36, the graphics engine 14 searches, or scans, pixels inside the tile 39 to locate pixels inside the polygon 36. The graphics engine 14 follows a pattern 37 governed by a major scan axis 42 and a minor scan axis 40, beginning at a starting point 43 at one of the corners of the tile 39. Along the pattern 37, the graphics engine 14 tests each pixel to determine if the pixel is inside the polygon 36, and if so, the graphics engine 14 transfers the associated color value to the buffer 18. If, however, the pixel is outside of the polygon 36, then no color value is transferred to the buffer 18.

In the scan, the graphics engine 14 typically advances one pixel along the major scan axis 42 after a line of pixels are scanned along the minor scan axis 40. For example the scan might begin at the corner 43 of the tile 39, with the major scan axis 42 having a vertical orientation and the minor scan axis 40 having a horizontal orientation. In this example, the graphics engine 14 begins each minor scan at the left vertical edge of the tile 39, i.e., the major scan path is along the left vertical edge of the tile 39. After each horizontal line of pixels is scanned from left to right (i.e., away from the corner 43 and along the minor scan axis 40), the graphics engine 14 advances vertically one pixel (i.e., away from the corner 43 and along the major scan axis 42) before scanning another horizontal line of pixels.

As shown, in this example, the major scan path eventually goes outside of the polygon 36 before all pixels inside of the polygon 36 are scanned. Thus, after the scan advances past a point 41 along the major scan path, the graphics engine 14 begins each minor scan outside of the polygon 36 and time is consumed testing pixels outside of the polygon 36, i.e., pixels to the left of the edge 31a.

Before scanning the tile 39, the graphics engine 14 typically selects the directions for the major 42 and minor 40 scan axes, along with the location of the starting point 43. In a graphics architecture known as the Talisman architecture, the starting point 43 (one of the corners of the tile 39) is chosen based on the angular orientations of the edges of the polygon that cross the tile 39. Once the starting point 43 is determined, the two scanning directions are defined; however, which direction is the major scan direction and which direction is the minor scan direction is left to be determined. If one of the edges of the tile 39 are known to contain pixels inside of the polygon 36 (based on the angular orientations of the edges), then the graphics engine 14 orients the major scan axis to follow that edge. Otherwise, the Talisman architecture directs that the width and height of the tile 39 govern the selection of the directions of the major 42 and minor 40 scan axes. As shown in FIG. 5, these criteria do not ensure that the scan pattern remains substantially inside of the polygon 36.

SUMMARY OF THE INVENTION

The invention provides a method and an apparatus for scanning a polygon that selects scan directions in a manner to keep the scan pattern inside of the polygon. A direction (e.g., the direction of the major scan axis) is chosen so that once inside the polygon, advancements along the direction do not take the scanning substantially outside of the polygon until substantially all of the interior pixels of the polygon have been scanned. The direction is selected based on the angular orientations of the edges of the polygon. During the scanning, advancements along the direction result in starting points from which lines of pixels are scanned (e.g., lines following a minor scan axis). Each line of pixels ends at one of the edges of the polygon. By selecting the direction in this manner, a minimal number of pixels outside of the polygon are scanned. As a result, the time required to scan the polygon (i.e., the number of clock cycles required to scan the polygon) is minimized.

In preferred embodiments, the direction is a major scan direction, and the scanning of the pixel lines extends along a minor scan direction. The direction is selected so that at least one of the edges of the polygon has a nonpositive slope with respect to the major and minor scan directions. The direction may also be based on other criteria, so that the scanning of the pixels lines is directed toward an edge having a nonpositive slope. The advancement of the scanning may also include advancing toward or advancing away from an edge of the polygon that has a nonpositive slope. The scanning of the pixels includes scanning in a positive direction along the minor scan axis, as well as scanning in a negative direction along the minor scan axis.

The scanning of the pixel lines includes determining whether a pixel is inside the polygon, and if so, data (representative of a characteristic of the pixel) is transferred to a memory. Beginning at a point outside of the polygon, the scanning includes advancing along a path to the point inside the polygon. Based on the angular orientations of the edges and the closest distance between polygon and the point outside the polygon along one of the axes, a direction is selected for the path which extends along one of the axes. The polygon is formed from a triangle that is clipped inside a rectangular window, and the point outside of the polygon is located near one of the corners of the window. Selecting directions includes aligning the direction with one of the edges of the window. A determination is made whether points near the corners of the window are in the polygon, and if not, beginning at one a point near one of the polygon, advancement is made along a path to the point inside the polygon. The selection of the direction is also based on the number of pixels inside the polygon that can be scanned along one of the axes.

The scanning may be performed by a graphics system that is used with another system which is capable of furnishing data representative of a polygon. The polygon is represented on a display by pixels, and the polygon has edges with angular orientations. The graphics system includes a memory and a graphics engine. The graphics engine is configured to use the data to begin at a point inside the polygon and advance along a direction to other points inside the polygon. The graphics engine tests lines of pixels, with each line of pixels beginning at one of the points and ending at one of the edges of the polygon. Based on the angular orientations of the edges, the graphics engine is configured to select the direction such that substantially all of the pixels inside of the polygon are scanned before the advancement along the direction reaches a point outside of the polygon. Based on the test of the pixels, the graphics engine is also configured to transfer values associated with characteristics of the pixels to the memory. An output interface of the graphics system is connected to retrieve the values from the memory and generate signals for displaying the polygon on the display.

The graphics system may be part of a computer system that has a processor that is configured to furnish data representative of a polygon. A display of the computer system is connected to receive the signals from the output interface and display the polygon.

Other advantages and features will become apparent from the description and from the claims.

BRIEF DESCRIPTION OF THE DRAWINGS

FIGS. 7, 9, 10, 13 and 14 are views of intersections between triangles and rectangular windows.

FIG. 11 is a view of a triangle.

FIG. 12 is a table illustrating logic to determine angular orientations of edges of a triangle.

DESCRIPTION OF THE PREFERRED EMBODIMENTS

Figure 1:
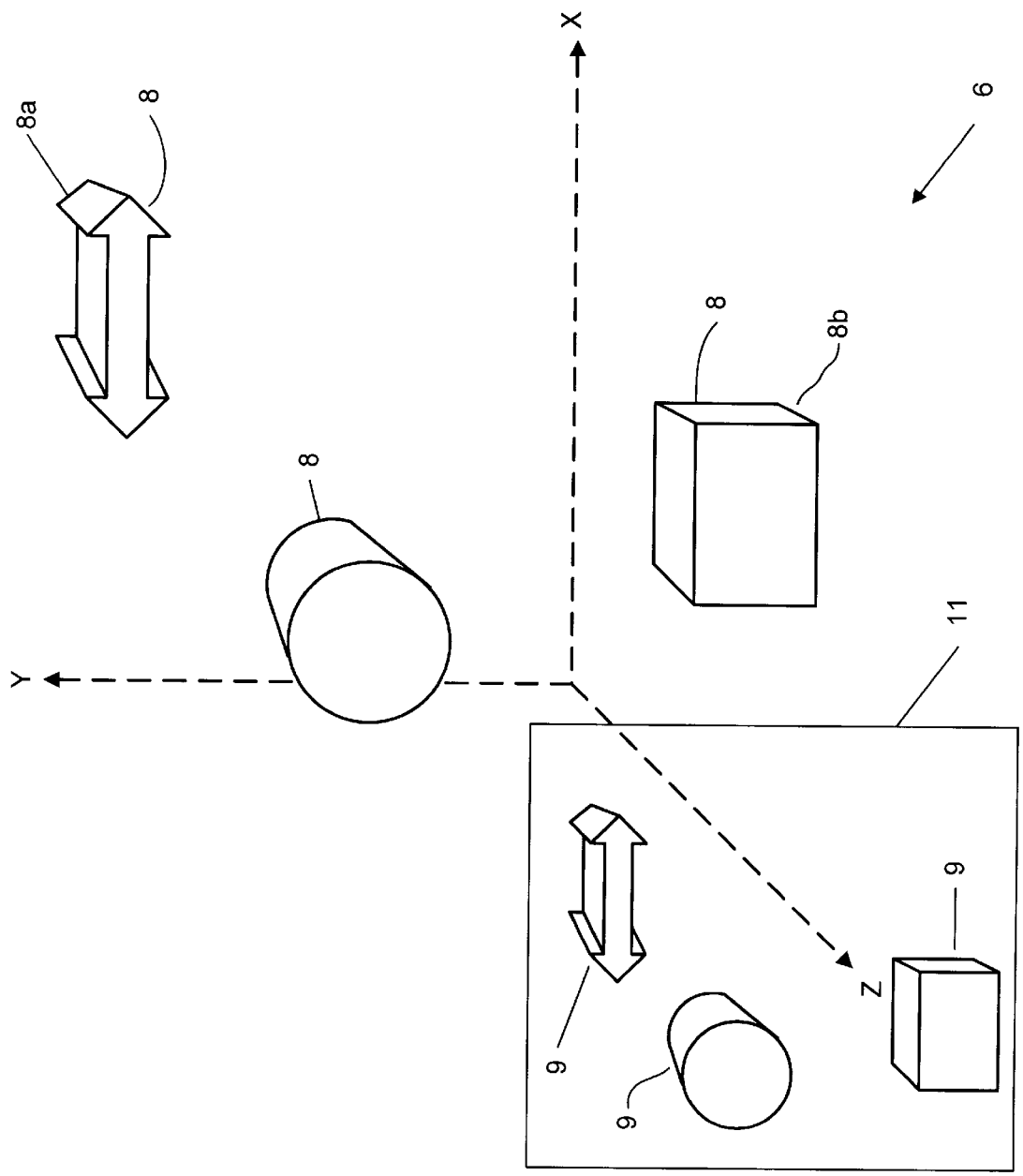
FIG. 1 is an illustration of a three-dimensional image.
Figure 2:
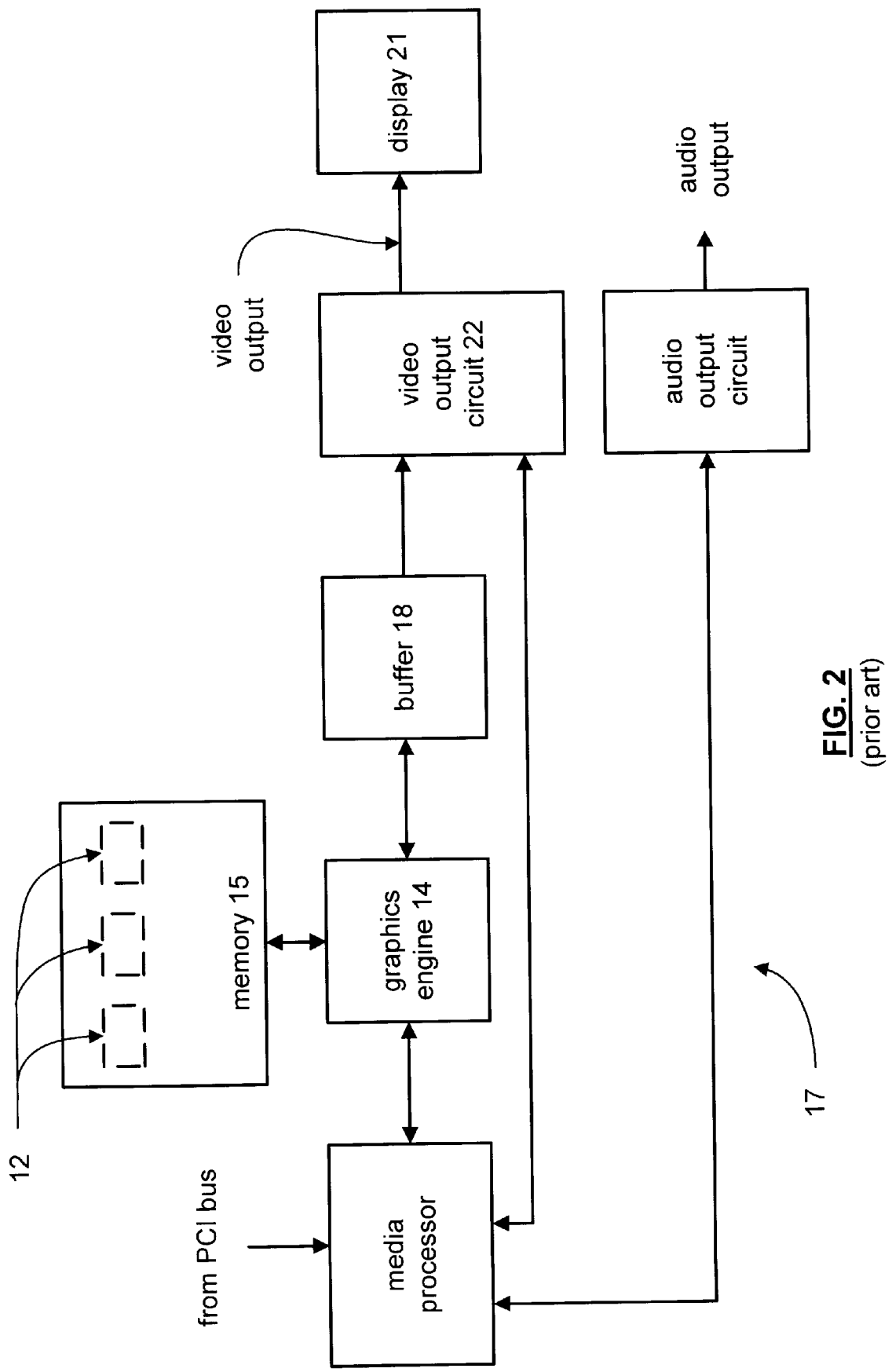
FIG. 2 is a block diagram of a graphics system of the prior art.
Figure 3:
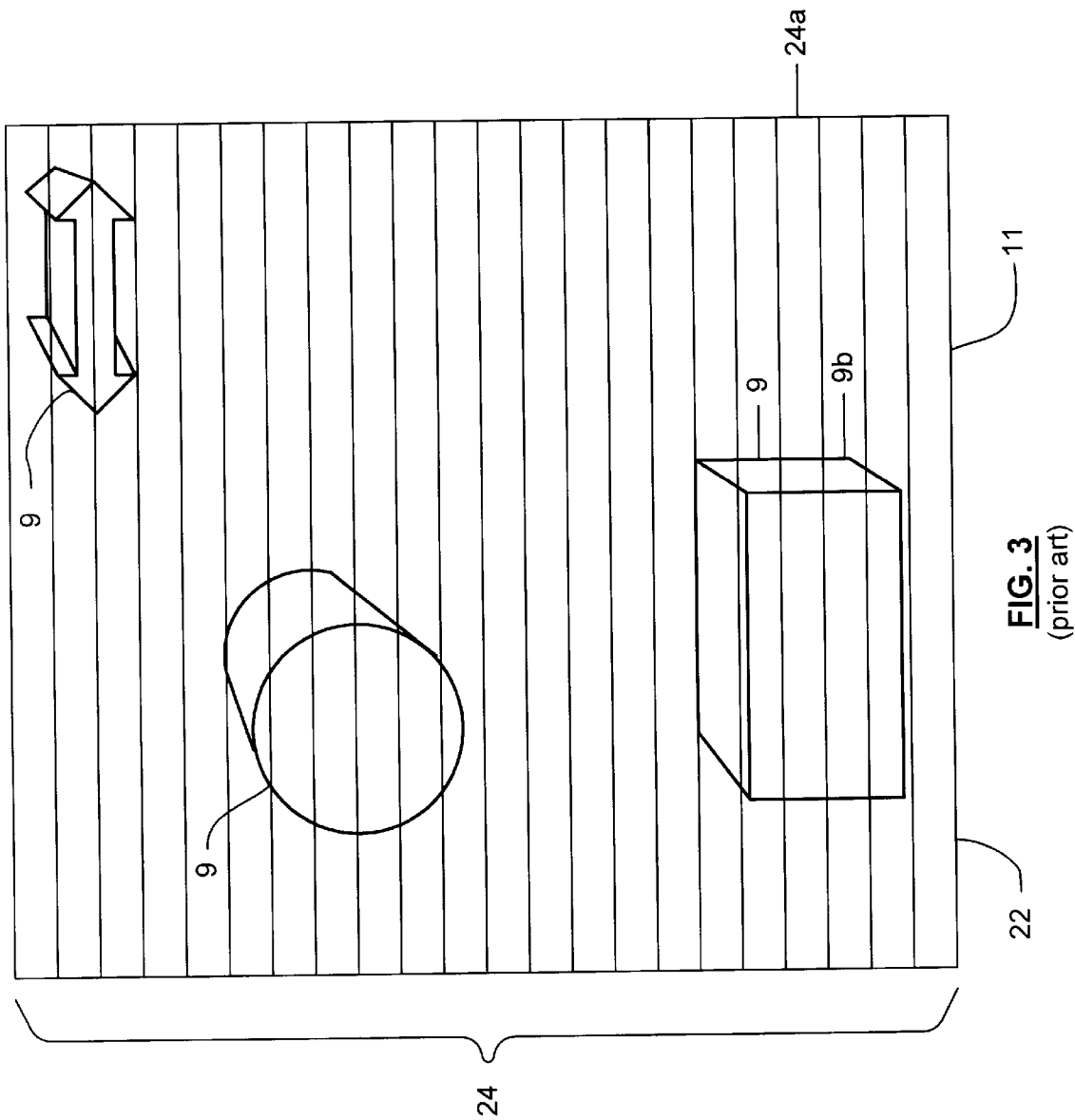
FIG. 3 is a view of the image of FIG. 1 on a display.
Figure 4:
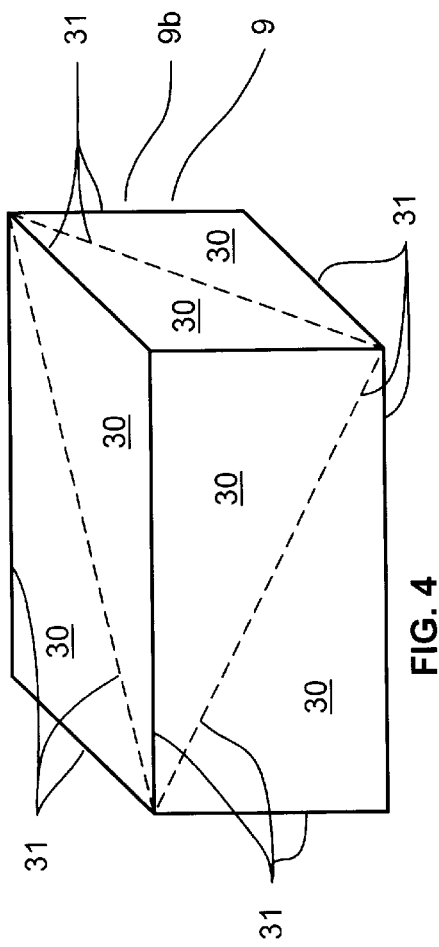
FIG. 4 is a view of an object of the image of FIG. 1.
Figure 5:
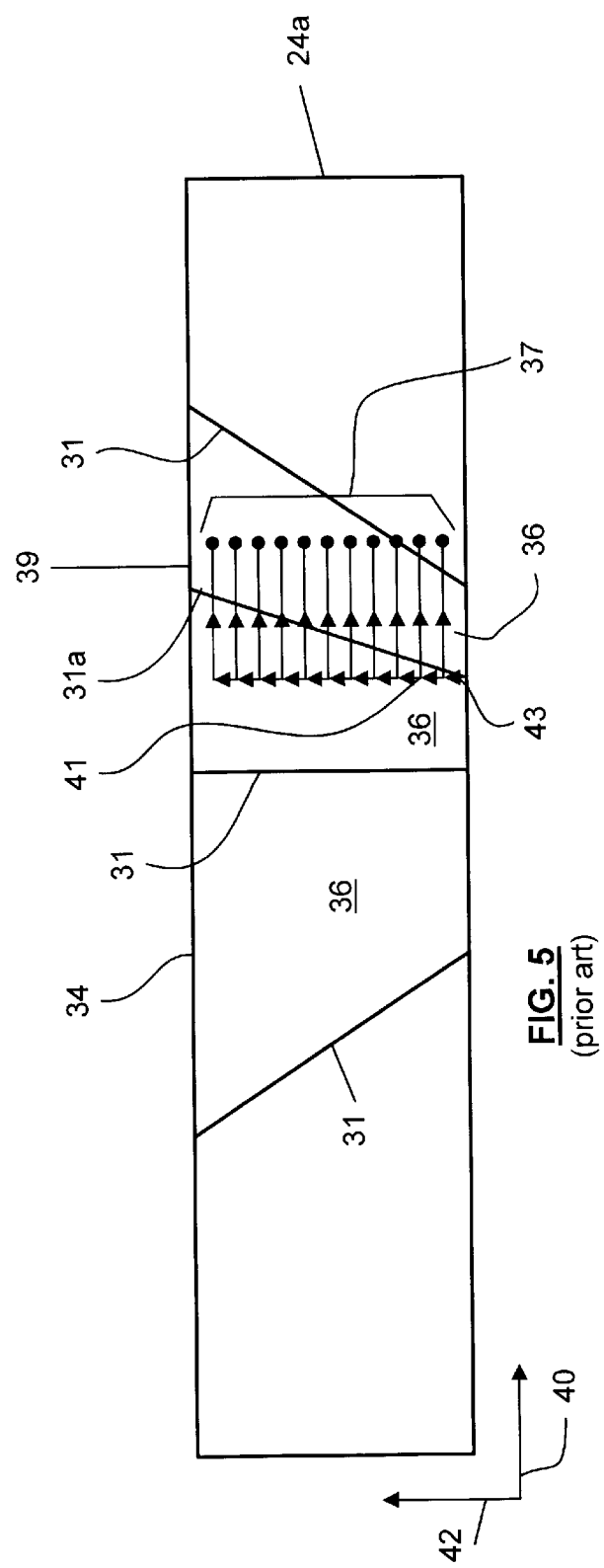
FIG. 5 is a view of a horizontal band of the display.
Figure 6:
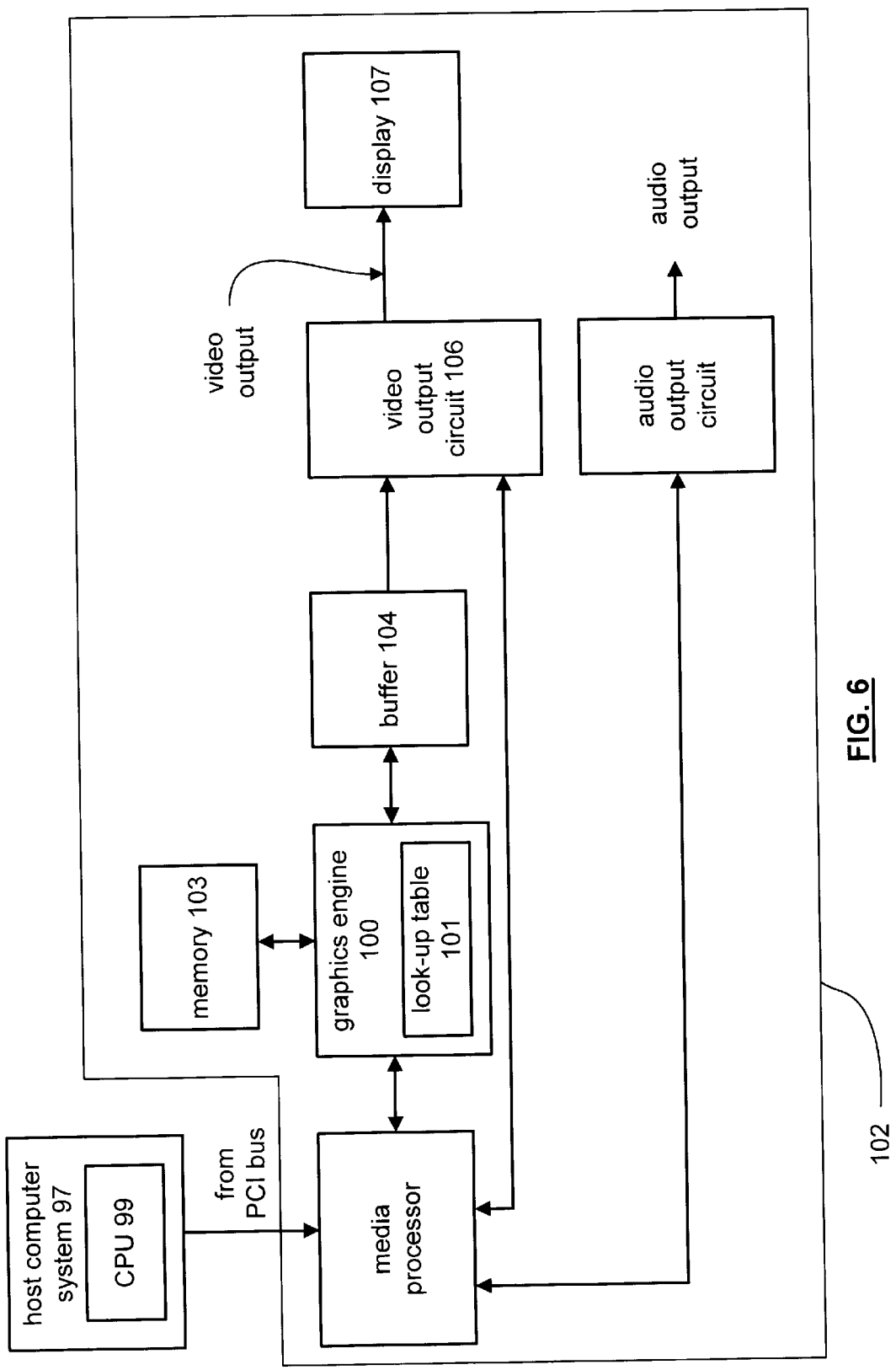
FIG. 6 is a block diagram of a graphics system according to one embodiment of the invention.
Figure 7:
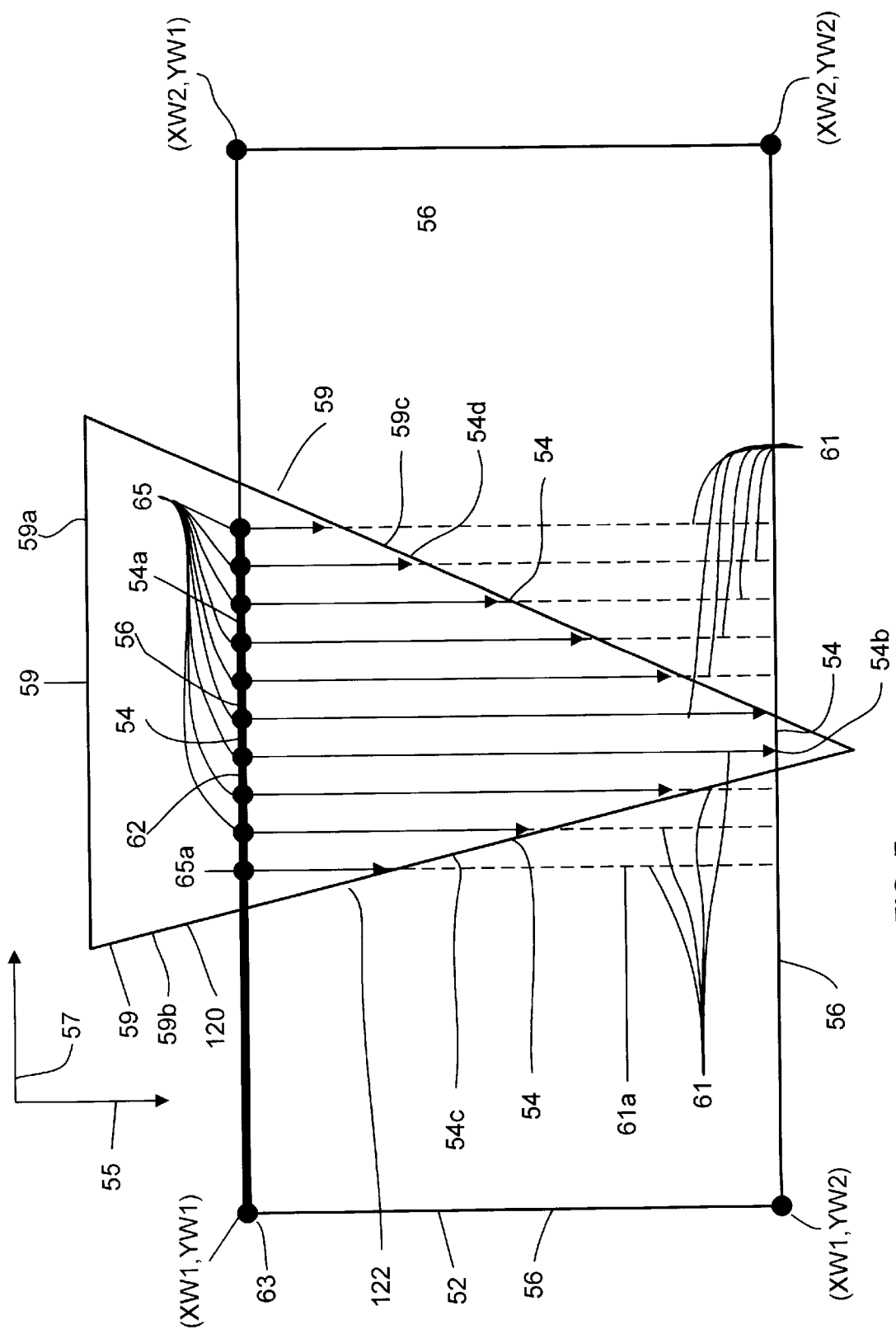

As shown in FIGS. 6 and 7, in order to paint, or fill in, a polygon 122, a graphics engine 100 is constructed to select scan directions (e.g., directions for a major scan axis 57 and a minor scan axis 55) in a manner to keep the resultant scanning pattern (used to scan the polygon 122) inside of the polygon 122. To accomplish this, the graphics engine 100 is configured to select a direction for the major scan axis 57 such that, once scanning begins inside the polygon 122, advancements along the major scan axis 57 do not take the scan outside of the polygon 122 until the scan is completed. As a result, the graphics engine 100 spends a minimal amount of time scanning pixels outside of the polygon 122, i.e., the pixels located between the exterior of the polygon 122 and the edges 56 of the a tile 52 (described below).

The scanning decisions made by the graphics engine 100 directs the interior scanning of the polygon 122 along a path 62 (beginning at point 63 inside the polygon 122). The graphics engine 100 uses points on the path 62 as initial starting points 65 for scanning lines 61 of pixels along the minor scan axis 55 in both positive and negative (if necessary, as described below) directions. When scanning one of the lines 61 (in a positive or negative direction along the minor scan axis 55), the graphics engine 100 tests the position of each pixel on the line 61 to determine when one of the edges 54 (e.g., edges 54b, 54c, or 54d) of the polygon 122 has been reached. Upon this occurrence, the graphics engine 100 determines whether additional scanning of the line 61 is required along the opposite direction (further described below). If not, the graphics engine 100 advances along the path 62 (in the general direction of the major scan axis 57) to the next point 65 and scans another line 61.

As described further below, the points of the path 62 are defined by where scans in the negative direction (if any) along the minor scan axis 55 intersect the edges 54 of the polygon 122. In some cases (e.g., as shown in FIG. 7), the path 62 may directly follow the major scan axis 57. The scan axes 55 and 57 are chosen so that the edges 54 at which scans along the minor scan axis 55 terminate (i.e., the edges followed by the path 62) are "shrinking edges," or edges that have a nonpositive slope (e.g., a vertical slope, a zero slope, or a negative slope) with respect to the major 57 and minor 55 scan axes. As a result, although scanning directly along the major scan axis 55 (a direction not necessarily followed by the path 62) may intersect one of the edges 54 of the polygon 122 before the scan is completed, the path 62 does not. The criteria used in deriving the path 62 from the major and minor scan directions is further explained below.

Starting from the path 62, the graphics engine 100 successively scans the lines 61 until all lines 61 intersecting the polygon 122 have been scanned. As a result of the scanning, the graphics engine 100 locates each pixel in the interior of the polygon 122, and for each pixel located, the graphics engine 100 transfers the appropriate color value to a buffer 104.

The polygon 122 is part of a triangle 120 that has been "clipped" within a rectangular window, or tile 52, for processing. The intersection of the edges 56 of the tile 52 with the triangle 120 provides two edges 54a and 54b of the polygon 122, with the remaining edges 54c and 54d being part of the original triangle 120.

Referring to FIG. 6, the graphics engine 100 is part of a graphics system 102 that receives at least initial object definitions from a central processing unit (CPU) 99 of a host computer system 97. The graphics system 102 has a memory 103 coupled to the graphics engine 100 for storing descriptions of the triangles 120 and the buffer 104 in which the graphics engine 100 stores the color values. A video output circuit 106 retrieves the color values from the buffer 104 and uses the color values to generate scan lines for a display 107.

Figure 8:
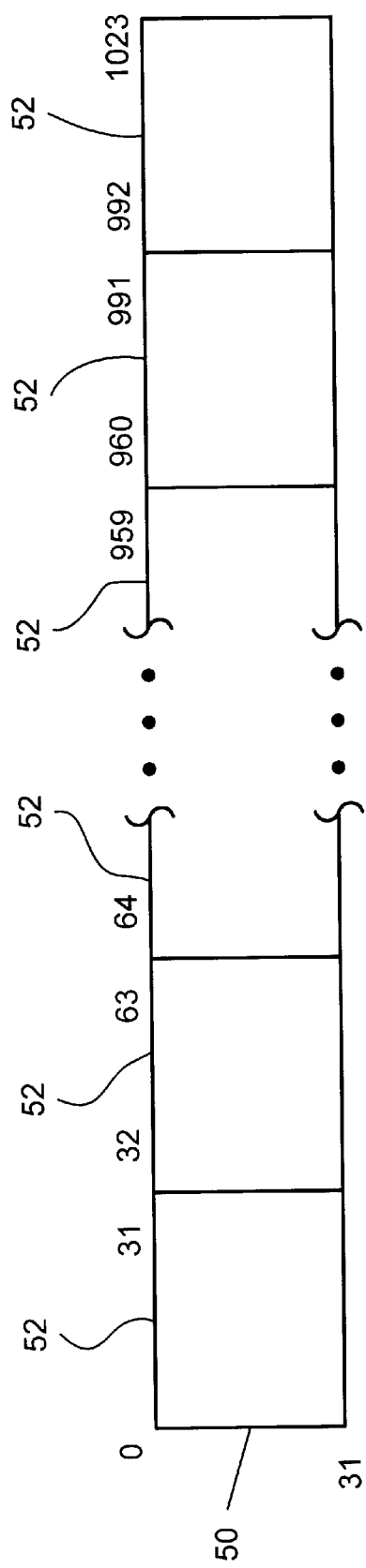
FIG. 8 is a view of a horizontal band of the display.

Referring to FIG. 8, the display 107 has horizontal scan lines of pixels which the graphics engine 100 groups into horizontal bands 50. Each band 50 contains a predetermined number (e.g., thirty-two) horizontal scan lines of pixels. The engine 100 subdivides each horizontal band 50 into a predetermined number (e.g., thirty-two) of the tiles 52. Thus, as an example, for a display having a resolution of 1024 by 768, each tile 52 might have a width of thirty-two pixels and a height of thirty-two pixels.

As shown in FIGS. 9 and 10, because of the many possible angular orientations of the triangles 120 and the many possible portions of the triangle 120 that can intersect the tile 52, the graphics engine 100 classifies the resulting polygons 122 to belong to one of fifteen groups (group numbers 0–14). As examples, some polygons 122 (e.g., group numbers one through four) are the result of only one edge 59 of the triangle 120 intersecting the tile 52, and other polygons 122 (e.g., group numbers eleven through fourteen) are the result of all of the edges 56 of the tile 59 intersecting the triangle 120. As described below, each group is represented by a multi-bit identifier GROUP[3:0], and each group has an associated initial starting point, major scan direction and minor scan direction. The graphics engine 100 initially finds out the angular orientations of the edges intersecting the tile 59, constructs the group code GROUP[3:0], and then the graphics engine 100 uses a lookup table to determine the starting point and major and minor scan directions for the scan. The starting point for the scan is at one of the corners of the tile 59.

The graphics engine 100 initially begins the scanning of the polygon 122 at a point 63 near one of the corners of the tile 52. The orientation of the major 55 and minor 57 scan axes for the scanning, along with the location of the point 63 from which the scanning begins, is defined by the group classifying the polygon 122. The direction, if any, in which the engine 100 proceeds from the point 63 to locate a first interior pixel 65a (and beginning of the path 62, as shown in FIG. 7) of the polygon 122 is defined by an initial scan code (represented by a two bit signal called INITIALSCAN [1:0], described below). For each group, the initial scan code indicates whether the graphics engine 100 should proceed along the major scan axis 57 (indicated by the INITIALSCAN[1:0] signal being equal to "10b," where the suffix "b" denotes negative logic), the minor scan axis 55 (indicated by the INITIALSCAN[1:0] scan being equal to "10b"), or should not proceed (indicated by the INITIALSCAN[1:0] signal being equal to "00b") from the point 63 to locate the first interior pixel 65a. In this manner, first the major scanning direction is stepped, is necessary. This is done by testing the most significant bit of the INITIALSCAN[1:0] signal. If the most significant bit is set, the initial search steps along the major scan axis 57. If the stepping along the major scan axis 57 is not necessary, or the search along the major scan axis 57 fails to locate an interior pixel, then steps are made along the minor scan axis 55 if the least signficant bit of the INITIALSCAN[1:0] signal is set. Once the first interior pixel 65a is located, the graphics engine 100 begins scanning the interior of the polygon 122.

Referring to FIG. 11, to classify the polygon 122 as belonging to one of the groups, the engine 100 uses an edge function E(x,y) which edges 56 of the tile 59 are intersected by the triangle 120. For the edge 59a having endpoints $(X_A,Y_A)$ and $(X_B,Y_B)$, the edge function E(x,y) is described by the following equation:

$$E(x,y)=(x-x_A)A+(y-y_A)B$$

A is the edge distance gradient along the x-axis for the edge function E(x,y) described by the following equation:

$$A = \frac{\Delta y}{|\Delta x| + |\Delta y|}$$

where $$\Delta x = x_B - x_A$$

and $$\Delta y = y_B - y_A$$

B is the edge distance gradient along the y-axis for the edge function E(x,y) described by the following equation:

$$B = \frac{-\Delta x}{|\Delta x| + |\Delta y|}$$

By applying the edge function E(x,y) to one of the edges 59, the graphics engine 100 can determine whether a point 70 (e.g., a point at the center of the tile 59) can possibly be within the triangle 120. If the edge function E(x,y) furnishes a positive number, then the point 70 may be within 15 the triangle, and two other tests (for the other edges 59) are required to verify the location of the point 70. However, if the edge function E(x,y) furnishes a negative number, then the point 70 cannot be located within the triangle 70, and no other edge tests are necessary.

As an example, to determine whether the point 70 is inside the triangle 120, the edge function E(x,y) is applied to all three edges 59a, 59b and 59c of the triangle 120. The edge function E(x,y) returns a positive number for the edges 59c and 59b and a negative number for the edge 59a which means the point 70 is not located inside the triangle 120. In order for the edge function E(x,y) to behave as described above, the orientation of vectors assigned to the edges 59 (i.e., the ordering of the coordinates used in the edge function E(x,y)) must encircle the interior of the triangle 120 in a counterclockwise fashion.

The graphics engine 100 uses a point in the center of the tile 59 and applies the edge function E(x,y) to each one of the edges 56 of the tile 59. Based on these results, the graphics engine 100 uses the look-up table 101 to determine the starting point and major and minor scan directions.

In constructing the lookup table 101, the following priorities were used to assign the starting point 63; the major 55 and minor 57 scan axes; and the initial scan direction to a particular group. If the starting point 63 is inside the polygon 122, then no initial scan is needed (i.e., the graphics engine 100 sets the INITIALSCAN[1:0] signal equal to "00b"). The starting point 63 is chosen to be near the corner of the tile 52 that is closest to the first interior pixel 65a. Besides pointing to at least one edge 54 having a negative slope, the direction of the minor scan axis 55 is also chosen to minimize the number of required scans.

Figures 13, 14:
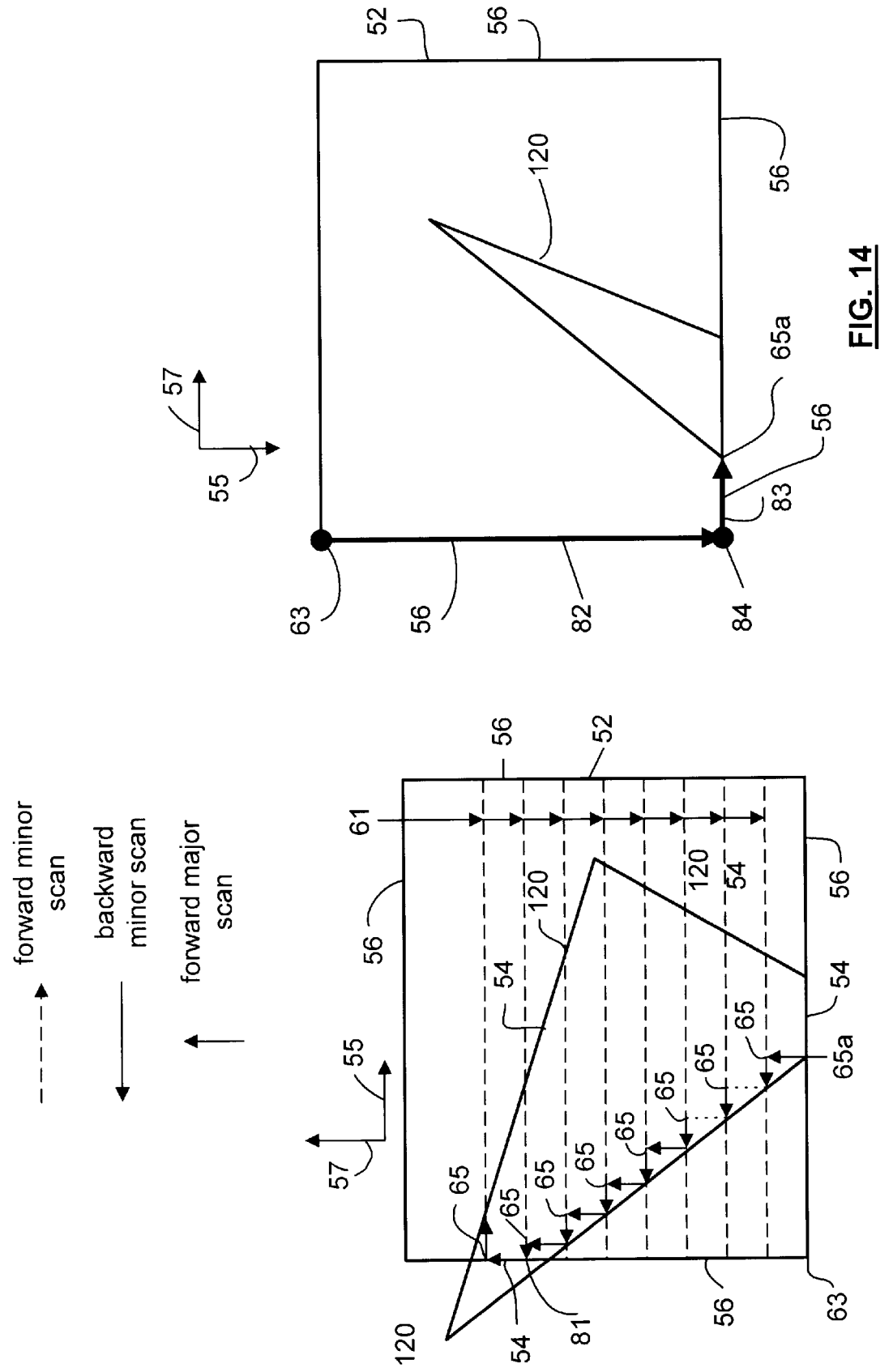

As shown in FIG. 13, because (once the initial interior point is located) the scanning is inside the polygon 122, scanning generally needs to proceed along both a positive and a negative direction along the minor scan axis 55. Thus, besides scanning in a positive direction along the minor scan axis 55, the graphics engine 100 is also configured to scan in a negative direction along the minor axis 55 when interior pixels are located on the negative side of the path 62, (i.e., when the path 62 extends along an edge 54 that has a negative slope with respect to the major 57 and minor 55 scan axes). When this occurs, the graphics engine 100 first scans in a positive direction (with respect to the minor scan axis 55) along the line 61 until the graphics engine 100 reaches one of the edges 64 of the polygon 122. The graphics engine 100 then returns to the initial point 65 associated with the line 61 and scans in a negative direction along the line 61 until the graphics engine 100 reaches another one of the edges 54 of the polygon 122. When this occurs, the graphics engine 100 advances in a positive direction along the major scan axis 57 to the next point 65. When the path 62 reaches one of the edges 56 of the tile 52 (e.g., at a point 81), no additional scanning in the negative direction along the minor scan axis 55 is required.

As shown in FIG. 14, when performing an initial search along the scan axis (55 or 57) in the direction indicated by the INITIALSCAN[1:0] signal (e.g., along a path 82), the graphics engine 100 may encounter one of the edges 56 of the tile 52 before encountering the first interior pixel 65a. Upon this occurrence, the graphics engine 100 redirects the search along the other scan axis, (e.g., along a path 83) beginning at the point (e.g., a point 84) where the edge 56 was encountered.

Figure 15:
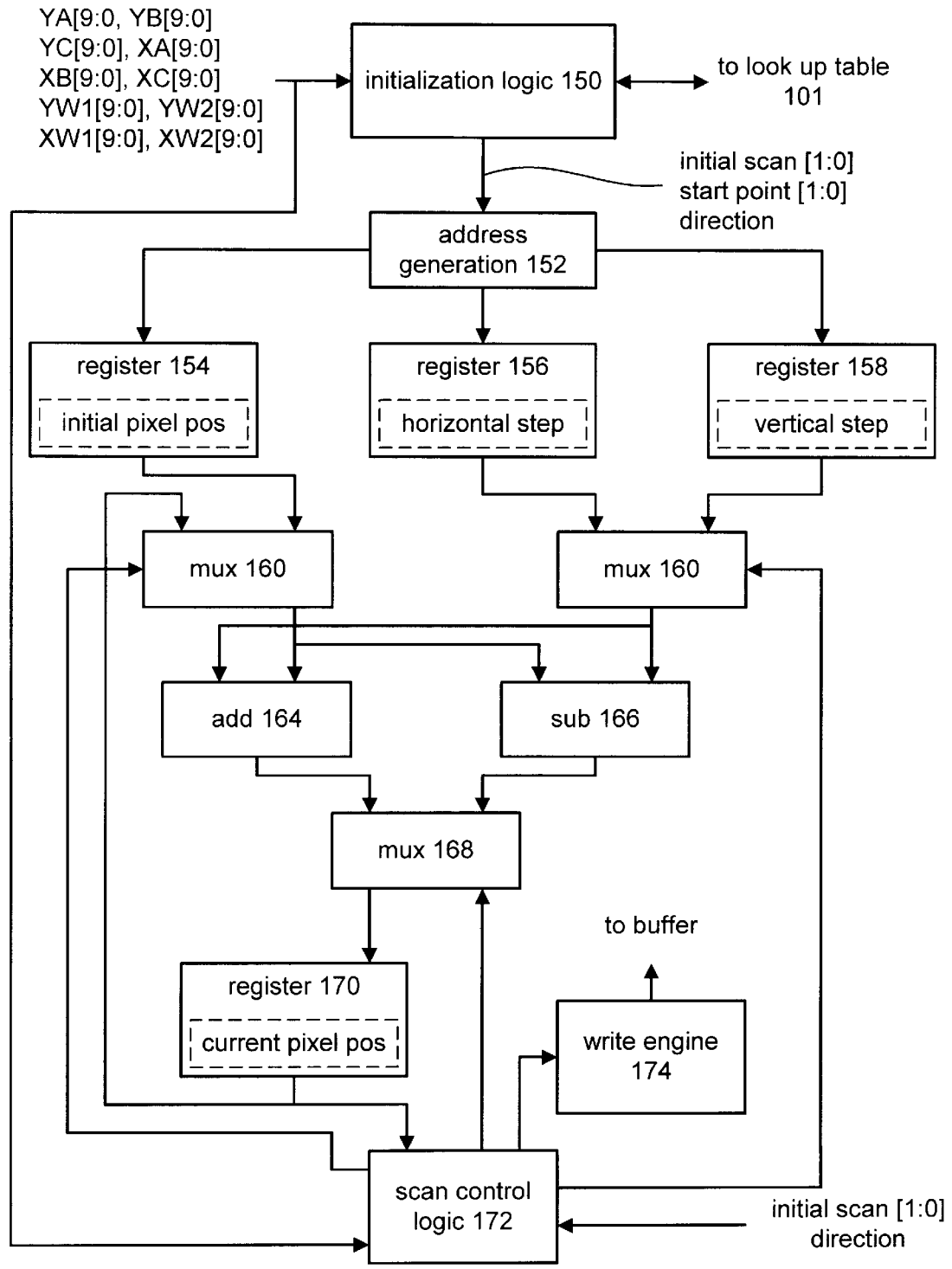
FIG. 15 is a block diagram of the graphics engine of FIG. 6.

As shown in FIG. 15, the graphics engine 100 has initialization logic 150 which receives the vertices of the triangle 120 (represented by XA[9:0], YA[9:0], XB[9:0], YB[9:0], XC[9:0] and YC[9:0]) and the corners of the tile 52 (represented by XW1[9:0], YW1[9:0], XW2[9:0], and YW2 [9:0]). Based on these input, the initialization logic 150 uses the lookup table 101 to furnish the initial scan direction (represented by INITIALSCAN[1:0], the initial corner (represented by STARTPOINT[1:0]) of the tile 59 from which to begin the scan, and the orientation (represented by DIRECTION) of the minor 55 and major 57 scan axes.

The outputs of the initialization logic 150 are furnished to an address generator 152 which stores a value indicative of the starting point 63 in a register 154. The address generator 152 furnishes a value that is indicative of a horizontal pixel step (e.g., one pixel) used when advancing along a horizontal line, or row, of pixels, and the generator 152 stores this value in a register 156. The address generator 152 also furnishes a value that is indicative of a vertical pixel step (e.g., 1024 pixels) used when advancing along a vertical line, or column, of pixels, and the generator 152 stores this value in a register 158.

Scan control logic 172 of the graphics engine 100 controls advancement along the minor 55 and major 57 axes. The scan control logic 172 accomplishes this by using an adder 164 and a subtractor 166 to advance the scan in either a positive or negative direction along the scan axes 55 and 57. After the scan advances past the starting point 63, a value indicative of the current pixel position of the scan is stored in a register 170. To ascertain the current pixel position, the scan control logic 172 uses a multi-bit mulitplexer 160 to initially select the pixel position of the point 63 (stored in the register 154) and thereafter, the scan control logic 172 selects the pixel position stored in the register 170.

Depending on the state of the current scan, the scan control logic 172 uses a multi-bit multiplexer 162 to select either the vertical pixel step (stored in the register 158) or the horizontal pixel step (stored in the register 156). An adder 164 adds the selected step (vertical or horizontal) to the current pixel position, and a subtractor 166 subtracts the selected step from the current pixel position. Depending on the state of the current scan, the scan control logic 172 selectively connects either the output of the adder 164 or the subtractor 166 to the register 170 (i.e., the scan control logic 172 updates the register 170 with the next pixel position).

As examples, when the starting point 63 is located at the lower lefthand corner of tile 52 and the minor 55 and major 57 axes are oriented in horizontal and vertical directions, respectively (e.g., the configurations for group number five), the scan control logic 172 selects the outputs of the register 156 (for the horizontal step) and the adder 164 when advancing in a positive direction along the minor scan axis 55. When advancing in a negative direction along the minor scan axis 55, the scan control logic 172 selects the outputs of the register 156 and the subtractor 166. When advancing in a positive direction along the major scan axis 57, the scan control logic selects the outputs of the register 158 (for the vertical step) and the adder 164.

The scan control logic 172 receives the current pixel position from the register 170, and using the vertices of the triangle 120 and tile 52, the scan control logic 172 determines whether one of the edges 54 of the polygon 122 has been reached. If so, the scan control logic 172 either advances along the major scan axis 57 (if the scan is not complete and a scan in the negative direction along the minor scan axis 55 is not required); scans in a negative direction along the minor scan axis 55; or deems the scan complete and returns to an idle state.

Figure 16:
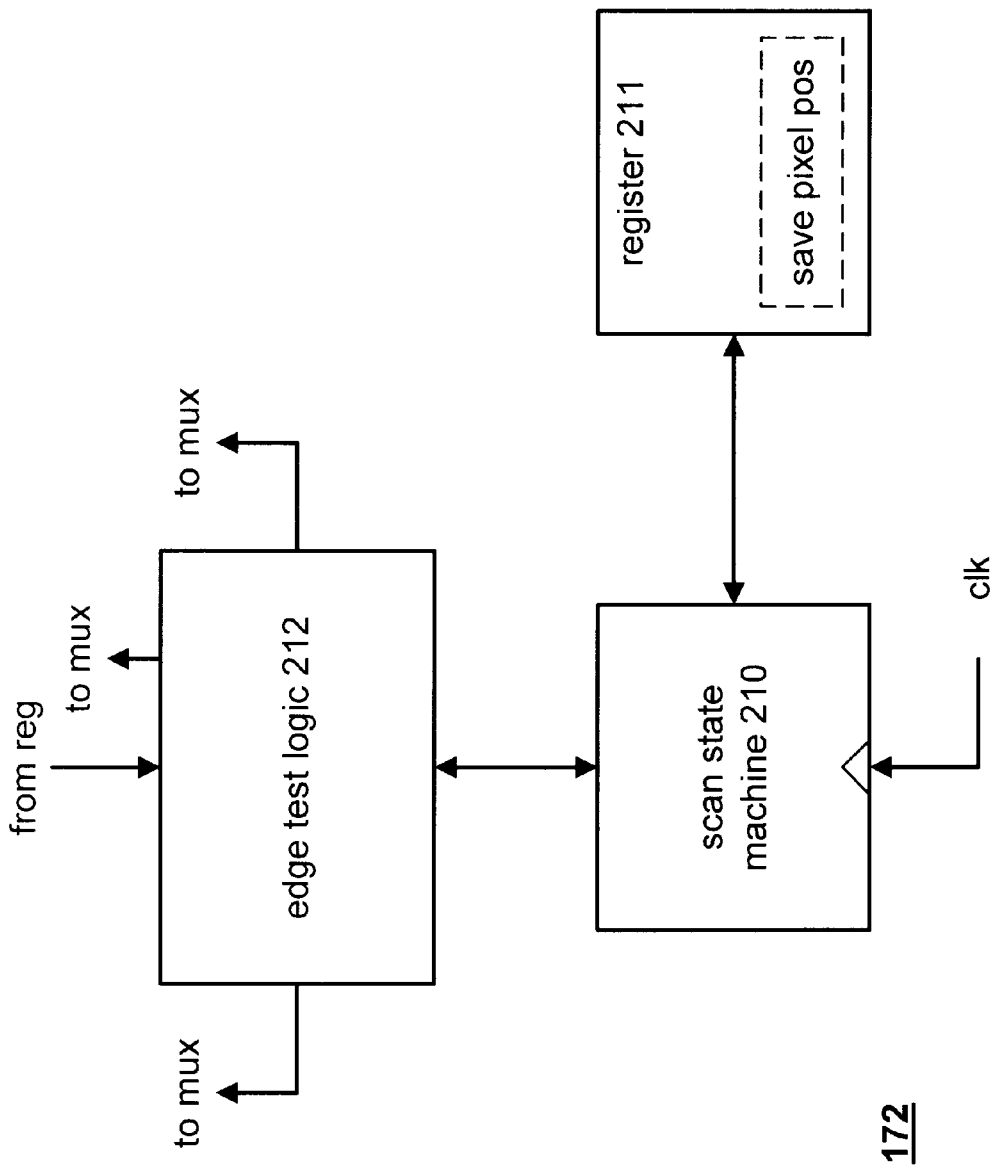
FIG. 16 is a block diagram of the scan control logic of FIG. 15.

As shown in FIG. 16, the scan control logic 172 includes a scan state machine 210 which is clocked on the positive edge of a clock signal called CLK (e.g., a PCI bus clock signal). Edge test logic 212 of the scan control logic 172 indicates to the scan state machine 210 whether the current pixel position is inside the polygon 122. The edge test logic 212 uses the edge function E(x,y) (as applied to all edges 54 of the polygon 122) to determine whether one of the edges 54 has been reached. The scan control logic 172 also has a register 211 for saving a pixel position, as described below.

Figure 17:
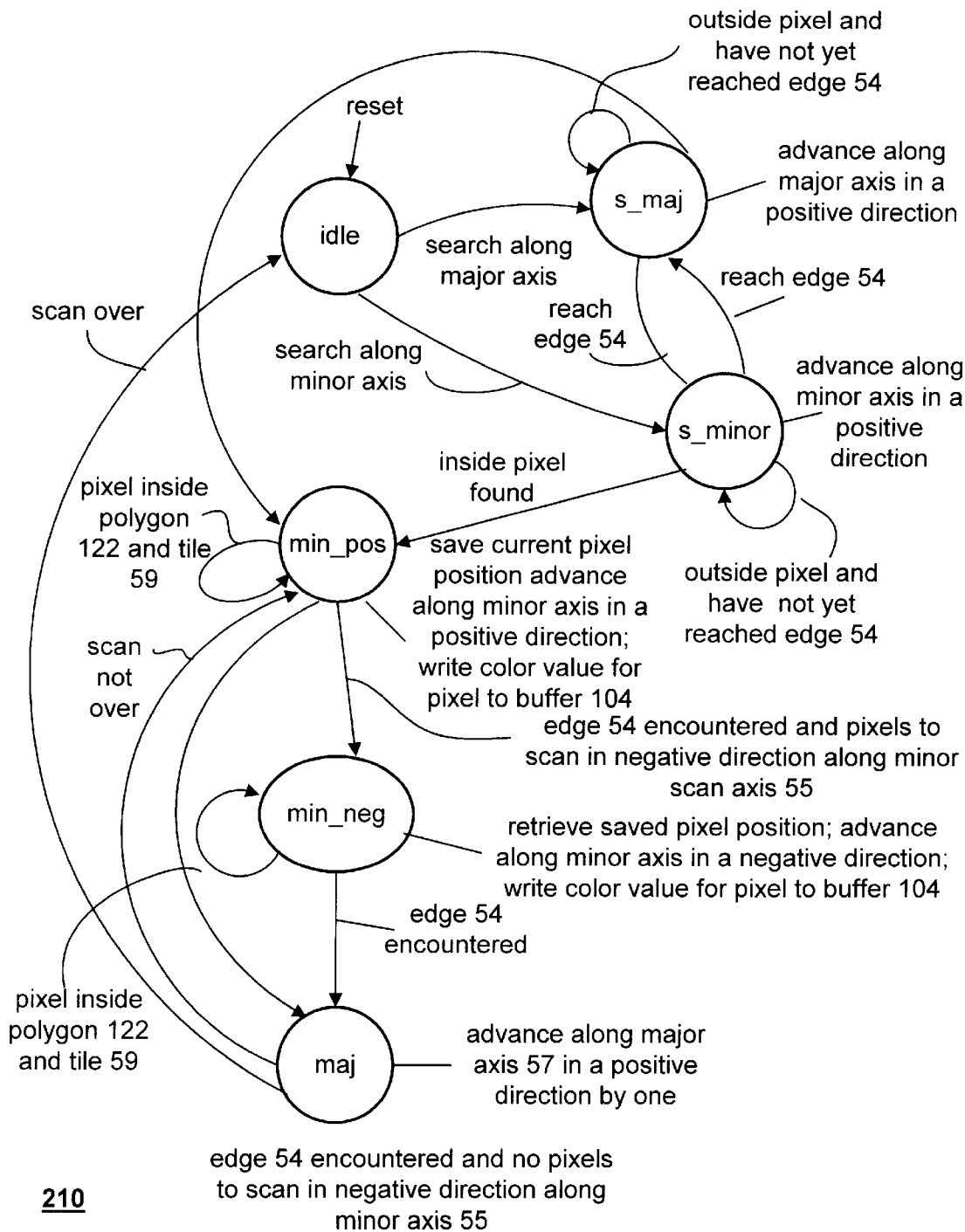
FIG. 17 is a state diagram illustrating operation of the scan state machine of FIG. 16.

As shown in FIG. 17, the scan state machine 210 enters an IDLE state after reset, and the scan state machine 210 remains in the IDLE state until the scan begins. Once the scan begins, the state machine 210 enters either a S_MAJ state or a S_MIN state, depending on whether the initial scan direction signal INITIALSCAN[1:0] indicates an initial scan along the major scan axis 57 or the minor scan axis 55, respectively.

The state machine 210 remains in the S_MAJ state until the first interior pixel 65a is located along the major scan axis 57. However, if one of the edges 54 is reached before the first interior pixel 65a (FIG. 14), the scan state machine 210 transitions to the S_MIN state to scan for the first interior pixel 65a along the minor scan axis 55. Likewise, the state machine 210 remains in the S__MIN state until the first interior pixel 65a is located along the minor scan axis 55. However, if one of the edges 54 is reached before the first interior pixel 65a, the scan state machine 210 transitions to the S__MAJ state to scan for the first interior pixel 65a along the major scan axis 57.

Once the first interior pixel 65a is located, the scan state machine 210 transitions to a MIN__POS state to begin scanning pixels inside the polygon 122. The scan state machine 210 first saves the current pixel position (i.e., stores the current pixel position in the register 211) and then proceeds to advance in a positive direction along the minor scan axis 55. Until one of the edges 54 is reached, the scan state machine 210 interacts with the write engine 174 to transfer the pixel color values to the buffer 104. However, once one of the edges 54 is reached, the state machine 210 transitions to a MIN__NEG state if there are additional pixels to be scanned in a negative direction along the minor scan axis 55. Otherwise, the scan state machine 210 transitions to a MAJ state.

In the MIN__NEG state, the state machine 210 begins at one of the points 65 on the path 62 and scans in a negative direction along the minor scan axis 55. Until one of the edges 54 is reached, the scan state machine 210 interacts with the write engine 174 to transfer the pixel color values to the buffer 104. However, once the edge 54 is detected, the scan state machine 210 transitions to the MAJ state.

In the MAJ state, the scan state machine 210 advances in a positive direction along the major scan axis 57. If the scan is over, the scan state machine 210 returns to the IDLE state. Otherwise, the scan state machine 210 returns to the MIN__POS state.

Other embodiments are within the scope of the following claims.

What is claimed is:

1. A method for use with a graphics system for scanning a polygon, the polygon represented on a display by pixels and having edges with angular orientations, comprising:
   determining the angular orientations of the polygon;
   determining a major scan direction and a minor scan direction based on the determining of the angular orientations;
   determining a stating point for rendering the polygon based on the determining of the angular orientations;
   beginning at the starting point, scanning a line along the minor direction to other points inside the polygon; and
   advancing, in the major direction, to scan other lines of the polygon.

2. The method of claim 1, wherein the determining of the major scan direction further comprises selecting the major scan direction so that at least one of the edges of the polygon has a nonpositive slope with respect to the major and minor scan directions.

3. The method of claim 2 wherein
   the determining the angular orientations further comprises classifying the polygon as one of a plurality of orientated polygons;
   wherein the determining the major and minor scan directions further comprises accessing a look up table to identify the major and minor scan directions based on the classification of the polygon; and
   wherein the determining the starting point further comprises accessing the look up table to identify the starting point based on the classification of the polygon.

4. The method of claim 2 wherein the minor scan direction is orthogonal to the major scan direction.

5. The method of claim 1 wherein the advancing further comprises advancing in a positive minor scan direction or advancing in a negative minor scan direction based on an edge of the polygon.

6. The method of claim 1 further comprising;
   beginning at a point outside of the polygon, advancing along another path to determine the starting point.

7. The method of claim 6 further comprising:
   based on the angular orientations of the edges, selecting a direction for the another path.

8. The method of claim 6 wherein the another path is either substantially parallel with or orthogonal to the direction.

9. The method of claim 8 further comprising:
   based on the angular orientations of the edges and the closest distance between polygon and the point outside the polygon along one of the axes, selecting a direction for the another path.

10. The method of claim 6, wherein the polygon is formed from a triangle clipped inside a rectangular window having corners, and the point outside the polygon is located near one of the corners.

11. The method of claim 1, wherein the polygon is formed from a triangle clipped inside a rectangular window having vertical and horizontal edges, and the selecting the direction includes aligning the direction with one of the edges of the window.

12. The method of claim 1, wherein the polygon is clipped inside a rectangular window having corners, the method further comprising:
   determining whether at least one of the corners is in the polygon; and
   when none of the corners are within the polygon, beginning at one of the corners and advancing along another path to determine the starting point.

13. The method of clam 1 wherein the determining of the major and minor scan directions further comprises selecting the major scan direction based on the number of pixels inside the polygon that can be scanned in the minor direction.

14. A graphics system comprising:
   a memory; and
   a graphics engine configured to:
   determine the angular orientations of the polygon;
   determine a major scan direction and a minor scan direction based on the determining of the angular orientations;
   determine a starting point for rendering the polygon based on the determining of the angular orientations;
   begin at the starting point, for scanning a line along the minor direction to other points inside the polygon; and
   advancing, in the major direction, to scan other lines of the polygon.

15. The graphics system of claim 14, wherein the graphics engine is connected to determine the major scan direction by selecting the major scan direction so that at least one of the edges of the polygon has a nonpositive slope with respect to the major and minor scan directions.

16. The graphics system of claim 15, wherein
   the determining of the angular orientations further comprises classifying the polygon as one of a plurality of orientated polygons;
   wherein the determining of the major and minor scan directions further comprises accessing a look up table to identify the major and minor directions based on the classification of the polygon; and wherein the determining of the starting point further comprises accessing the look up table to identify the starting point based on the classification of the polygon.

17. The graphics system of claim 14, wherein the graphics engine is further configured to:

beginning at a point outside of the polygon, advancing alone another path to determine the starting point; and based on the angular orientations of the edges and the closest distance between the polygon and the point outside the polygon, select the direction for advancing along the another path.

18. The graphics system of claim 14, wherein the polygon is formed from a triangle clipped inside a rectangular window having corners, and the point outside the polygon is located near one of the corners.

19. The graphics system of claim 14, wherein the polygon is formed from a triangle clipped inside a rectangular window having vertical and horizontal edges, the graphics engine further connected to:

align the direction with one of the edges of the window.

20. The graphics system of claim 14, wherein the polygon is clipped inside a rectangular window having corners, the graphics engine further connected to:

determine whether at least one of the corners is in the polygon; and when none of the corners arc within the polygon, beginning at one of the corners and advancing along another path to determine the starting point.

21. The graphics system of claim 14 wherein the graphics engine is further connected to:

determining the major and minor scan directions by selecting the major scan direction based on the number of pixels inside the polygon that can be scanned in the minor direction.

* * * * *